(No Model.)
2 Sheets—Sheet 1.
G. A. BISCHOFF.
GAS COOKING STOVE.
No. 471,208. Patented Mar. 22, 1892.
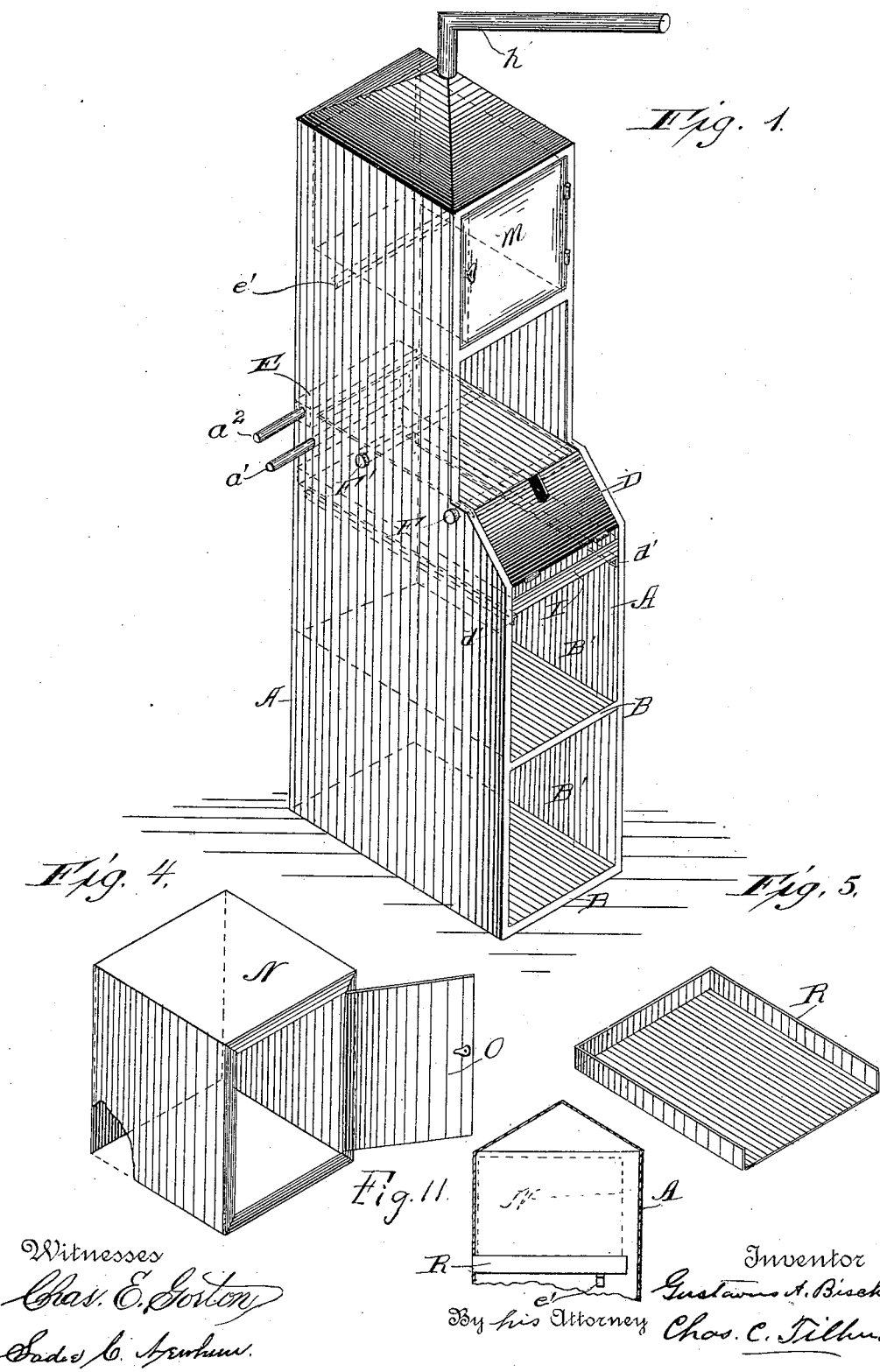

(No Model.) 2 Sheets—Sheet 2.
G. A. BISCHOFF.
GAS COOKING STOVE.
No. 471,208. Patented Mar. 22, 1892.
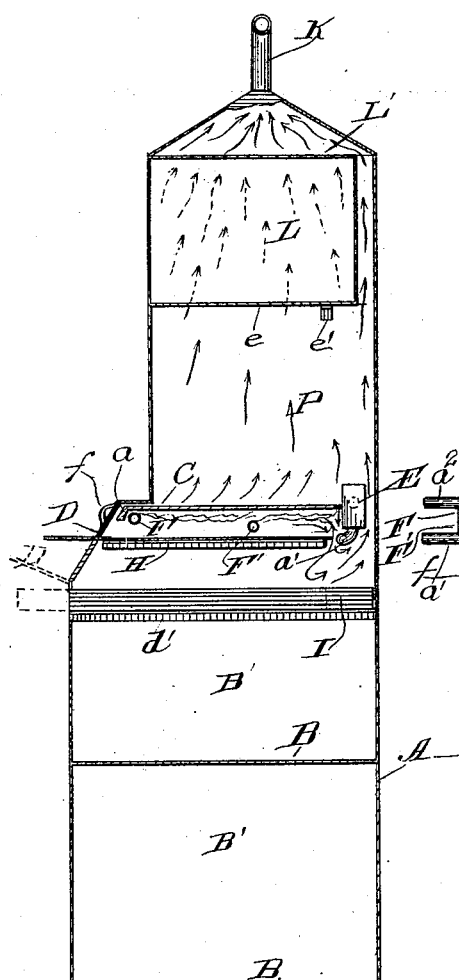
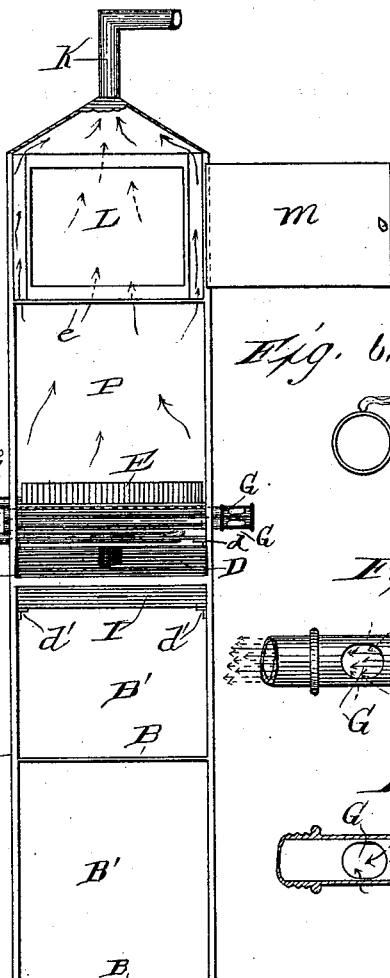
Witnesses
Chas. E. Gorton.
Sadie C. Newburn.
Inventor
Gustavus A. Bischoff
By his Attorney Chas. C. Tillman

UNITED STATES PATENT OFFICE.

GUSTAVUS A. BISCHOFF, OF CHICAGO, ILLINOIS.

GAS COOKING-STOVE.

SPECIFICATION forming part of Letters Patent No. 471,208, dated March 22, 1892.

Application filed February 3, 1891. Serial No. 380,076. (No model.)

*To all whom it may concern:*

Be it known that I, GUSTAVUS A. BISCHOFF, a citizen of the United States, residing at Chicago, in the county of Cook and State of Illinois, have invented certain new and useful Improvements in Gas Cooking-Stoves, of which the following is a specification.

My invention relates to improvements in cooking-stoves, and especially to that class of such stoves in which the fuel used is gas; and it consists in certain peculiarities of the construction and the novel arrangement and operation of the various parts thereof, as will be hereinafter fully set forth and specifically claimed.

The objects of my invention are, first, to provide a stove for cooking purposes which shall be inexpensive in construction, compact in form, yet having various compartments for different purposes, attractive in appearance, and strong and durable; second, a stove in which the process of cooking various articles of food—such as broiling meats, baking or roasting, &c.—can be done simultaneously without any increase in the quantity of fuel used over that required in cooking one article at a time, thus economizing in fuel, as well as enabling the cook to prepare a meal in a short length of time.

In order to enable others skilled in the art to which my invention pertains to make and use the same, I will now proceed to describe it, referring to the accompanying drawings, in which—

Figure 1 is a perspective view of my stove. Fig. 2 is a vertical sectional view thereof. Fig. 3 is a front view. Fig. 4 is a detail view of the removable oven. Fig. 5 is a similar view of a modification of a portion of the warming-chamber. Figs. 6 and 7 are end views of the gas-jets, showing the action or movement of the flames. Fig. 8 is a view in side elevation of a portion of one of the jets, showing the air-chamber thereof. Fig. 9 is a longitudinal section of Fig. 8. Fig. 10 is a view of a portion of one of the jets, showing the perforation therein. Fig. 11 is a side view of a portion of the upper part of the frame, showing a modification of the warming-chamber.

Similar letters refer to corresponding parts throughout the different views of the drawings.

A represents the main frame of my stove, and is made of any suitable size, form, and material, but preferably of the form illustrated in the drawings and of sheet metal. The front of this frame may be open, as shown, or may have doors to close the same; but for convenience I prefer to omit the doors, except that to the warming-chamber and the one in front of the flame, the function of which will be presently explained. The lower part of the frame A is provided with one or more floors B, thus forming compartments B' for the storage of vessels and cooking utensils or other articles.

At a convenient distance from the bottom of the frame, and between and to the sides thereof, is removably secured a flat plate C, which plate is preferably made of iron of a suitable thickness to retain the heat imparted to it by the flame from the burners or jets beneath. The front part of the plate C is formed with a depending flange $a$, against the outer surface of which the door D, when closed, rests. This flange extends downward until about flush with the lower surface of the front burner, thus causing an upward draft of air when the door D is open. The rear end of the plate C extends to near the back of the frame A, and jets against a water-back or receptacle E, which is secured in a horizontal position to the sides of the frame at a short distance from the rear wall thereof, thus causing the heat emitted from the flames of the burners to contact with its front portion and to pass under and to the rear thereof, as indicated by arrows. To the receptacle E are connected supply and discharge pipes $a'$ $a^2$, which are united at their other ends to a tank (not shown) in the usual manner. Just beneath the plate C are located a number of burners or jets F F', which are provided with perforations $b$ for the escapement of gas, and to cause the same to spread in a thin sheet of flame. As shown in the drawings, these burners have their bearings in the sides of the frame A and may be readily withdrawn therefrom and inserted from the opposite side, thus obviating the necessity of right and left burners.

By reference to Fig. 2 of the drawings it will be seen that the burner F, which is placed near the front of the frame A and plate C, is much nearer the under surface of the said plate than is the burner F', which is near the middle of the frame as well as the middle of plate, yet quite a distance beneath the latter. This manner of placing the burner is done to enable the flames from each burner to spread evenly on the under surface of the plate C and to impart a uniform heat thereto. If the burner F' was placed on a level with the burner F, it is evident that the flame from the latter would be impeded by the burner F', thus checking the smooth draft and preventing uniformity of heat to the plate C. The free ends of the burners are closed, and their opposite ends are united by a T-joint, which is connected to and receives gas from an ordinary gas pipe or tube. Between the T-joint or transverse pipe connecting the burner and the wall of the frame A each burner is provided with a hole G, made transversely through them to form air-chambers, so that air may be mingled with the gas as it passes from the jets $c$ in the partitions $c'$ into the burners, thereby obtaining a better combustion. A short distance beneath the burners F F' and to the side walls of the frame A is secured a guideway $d$ for supporting a gridiron or broiler H or other cooking utensil.

Beneath the supporting devices $d$ and to the side walls of the frame are secured similar supports $d'$ for supporting a pan I to catch the drippings from the meat when being cooked on the gridiron. This pan is placed at a proper point below the lower portion of the door D to admit a draft to the burners when said door is closed and also to allow the ready removal of the pan I when it is desired. Near the top of the frame A, which top gradually slopes to its apex and there unites with a pipe K, which carries away the fumes and odors, is formed a warming-chamber L, in which plates, dishes, &c., may be placed and kept warm. This chamber, as shown in Figs. 2 and 3, is provided with a floor $e$, which is secured to the front portion of the side walls of the frame A and is supported near its rear by a horizontal bar $e'$, which bar is connected to each side of the frame, as is clearly shown in Fig. 1. By reference to the drawings it will be seen and understood that the box L', forming the chamber L, has its front part open and that the sides and back thereof, as well as the top, has a space between them and the frame A, thus allowing the heat to surround the chamber as it passes upward and out the pipe K.

In front of the chamber L and to one side of the frame is hinged a door M for closing the chamber when it is desired. In Fig. 4 I have shown a removable oven N, which is preferably made in the form of a square box having a door O hinged to its front portion and having its bottom open, as shown.

When it is desired to use the oven for cooking, it is placed in the chamber P between the bottom of the chamber L and plate C, on the top of which plate its open bottom rests. It is evident that the heat rising from the plate will be confined in the oven, and the process of baking, roasting, &c., can be quickly and effectually done by placing the articles to be cooked within the oven. It is also apparent that the use of the oven does not interfere with the use of the gridiron, which can be used for its purposes at the same time. When the oven is removed from the plate C, it is obvious that the plate can be used for toasting bread, frying cakes, &c. I may sometimes convert the oven into a warming-chamber, and when this is done the box L', with the exception of its bottom, is removed and the tray R, (shown in Fig. 5,) having its front end open, is placed and secured on said floor, as seen in Fig. 11, when the oven may be placed in said pan or tray. (Shown by dotted lines in the latter figure.) When it is desired to remove the gridiron, the door D is opened to the position shown by dotted lines in Fig. 2, thus remaining in an inclined position by reason of its handle $f$ resting on the outer edge of the pan I, which has been partly drawn out, as shown by dotted lines. Any dripping from the article on the broiler will drop on the inclined door, which will convey the same into the pan, as will be readily understood.

Having thus fully described my invention, what I claim as new, and desire to secure by Letters Patent, is—

1. In a gas cooking-stove, the combination of a frame having its front open and provided with one or more compartments with a removable oven having its bottom open, a flat plate secured between the sides of the frame, a number of burners removably secured in the frame beneath the plate, and a gridiron or analogous utensil removably secured in the frame beneath the burners, all constructed, arranged, and operating substantially as and for the purpose set forth.

2. In a gas cooking-stove, the combination of the main frame A, having the warming-chamber L and compartments P B', with the removable oven N, the plate C, removably secured within the frame, the water-receptacle E, having the pipes $a'$ $a^2$, secured at the rear of the plate C within the frame, the perforated burners F F', having the air-chambers G, the partitions $c'$ and jets $c$, removably secured in the frame beneath the plate C, the utensil H, removably secured in the frame beneath the burners, and the pan I, removably secured in the frame beneath the utensil H, all constructed, arranged, and operating substantially as shown and described, and for the purpose set forth.

3. In a gas cooking-stove, the combination of the main frame A, having the box L', secured within the frame near its top and having a space between its sides, back, and top, and the frame, the pipe K, the compartments P B', with the removable oven N, the plate C, removably secured within the frame, the water-receptacle E, having the pipes $a'$ $a^2$, secured at the rear of the plate within the frame, the perforated burners F F', having the air-chambers G, the partitions $c'$ and jets $c$, removably secured in the frame beneath the plate C, the utensil H, removably secured in the frame beneath the burners, and the pan I, removably secured in the frame beneath the utensil H, all constructed, arranged, and operating substantially as set forth.

4. In a gas cooking-stove, the combination of the main frame A, having the box L', secured within the frame near its top and having a space between its sides, back, and top, and the frame, the pipe K, the compartments P B', with the removable oven N, the plate C, removably secured in the frame, the water-receptacle E, having the pipes $a'$ $a^2$, secured to the rear of the plate within the frame, the perforated burners F F', having the air-chambers G, the partitions $c'$ and jets $c$, removably secured in the frame beneath the plate C, the burner F being nearer the plate than the burner F', the utensil H, removably secured in the frame beneath the burners, and the pan I, removably secured in the frame beneath the utensil H, all constructed, arranged, and operating substantially as set forth.

5. In a gas cooking-stove, the combination of a main frame with a flat plate secured within said frame, a removable oven, a number of perforated burners having the air-chambers G, the partitions $c'$ and jets $c$, removably secured in the frame beneath the plate, the front burner being placed near the plate and each succeeding one a little farther therefrom, and the utensil H, removably secured in the frame beneath the burners, substantially as and for the purpose set forth.

6. In a gas cooking-stove, the combination of the main frame A, having the chamber L and compartments P B', said chamber and compartments being adapted to receive an oven, with a flat plate C secured between the sides of the frame A, a number of burners located beneath the plate C, having the air-chambers G, the partitions $c'$ and jets $c$, and the supports $d$ $d'$, secured beneath the burners, all constructed, arranged, and operating substantially as and for the purpose set forth.

GUSTAVUS A. BISCHOFF.

Witnesses:
CHAS. C. TILLMAN,
H. A. PIATT.